(12) United States Patent
Hill et al.

(10) Patent No.: US 9,799,449 B2
(45) Date of Patent: Oct. 24, 2017

(54) MULTILAYERED CERAMIC CAPACITOR WITH IMPROVED LEAD FRAME ATTACHMENT

(71) Applicant: Kemet Electronics Corporation, Simpsonville, SC (US)

(72) Inventors: R. Allen Hill, Simpsonville, SC (US); Philip M. Lessner, Simpsonville, SC (US); Reggie Phillips, Simpsonville, SC (US); Keith Brown, Simpsonville, SC (US); James B. Byrd, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 123 days.

(21) Appl. No.: 14/498,514

(22) Filed: Sep. 26, 2014

(65) Prior Publication Data

US 2015/0036263 A1 Feb. 5, 2015

Related U.S. Application Data

(62) Division of application No. 13/283,784, filed on Oct. 28, 2011, now abandoned.

(51) Int. Cl.
*H01G 2/06* (2006.01)
*H01G 4/008* (2006.01)
(Continued)

(52) U.S. Cl.
CPC .............. *H01G 2/06* (2013.01); *H01G 4/008* (2013.01); *H01G 4/232* (2013.01); (Continued)

(58) Field of Classification Search
CPC ........ H01G 4/2325; H01G 4/30; H01G 4/008; H01G 4/12; H01G 4/252
See application file for complete search history.

(56) References Cited

U.S. PATENT DOCUMENTS 4,517,155 A * 5/1985 Prakash .............. C04B 41/5127
252/512
4,564,563 A * 1/1986 Martin .................... H01B 1/22
252/514
(Continued)

FOREIGN PATENT DOCUMENTS

JP 08236393 A * 9/1996
JP WO 2011151894 A1 * 12/2011 ......... B23K 35/0244

*Primary Examiner* — David M Sinclair
(74) *Attorney, Agent, or Firm* — Joseph T. Guy; Perkins Law Firm, LLC

(57) ABSTRACT

A capacitor with improved lead frame attachment is described wherein the improved lead frame attachment mitigates defects. The capacitor comprises parallel conductive internal electrodes of alternating polarity with a dielectric between the conductive internal electrodes. A first copper undercoat is in electrical contact with the conductive internal electrodes of a first polarity and a second copper undercoat is in electrical contact with conductive internal electrodes of a second polarity. A first lead is in electrical contact with the first copper undercoat with a first solder between the first lead and the first copper undercoat. A second lead is in electrical contact with the second copper undercoat with a second solder between the second lead and the second copper undercoat.

41 Claims, 7 Drawing Sheets

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01); *Y10T 29/43* (2015.01)

(56) References Cited

U.S. PATENT DOCUMENTS

| | | | | |
|---|---|---|---|---|
| 4,776,883 | A * | 10/1988 | Hayashi | B22F 9/24 148/513 |
| 6,081,416 | A * | 6/2000 | Trinh | H01G 4/12 361/308.1 |
| 6,259,593 | B1 * | 7/2001 | Moriwaki | B23K 35/262 361/303 |
| 6,388,864 | B1 * | 5/2002 | Nakagawa | H01G 4/232 361/306.3 |
| 7,295,422 | B2 * | 11/2007 | Ito | H01G 4/08 361/321.4 |
| 2003/0189817 | A1 * | 10/2003 | Yoshii | H01C 1/144 361/773 |
| 2004/0144962 | A1 * | 7/2004 | Hayakawa | H01G 4/2325 252/500 |
| 2005/0083637 | A1 * | 4/2005 | Yoshll | H01G 4/2325 361/600 |
| 2006/0193744 | A1 * | 8/2006 | Yang | B23K 35/262 420/561 |
| 2009/0040688 | A1 * | 2/2009 | Kayatani | H01G 4/2325 361/321.1 |
| 2009/0296311 | A1 * | 12/2009 | Otsuka | H01G 2/065 361/306.3 |
| 2010/0123995 | A1 * | 5/2010 | Otsuka | H01G 2/06 361/308.1 |
| 2010/0202098 | A1 * | 8/2010 | Yanagida | H01G 4/232 361/305 |
| 2010/0243307 | A1 * | 9/2010 | McConnell | H01G 4/232 174/260 |
| 2013/0098506 | A1 * | 4/2013 | Toyoda | B23K 35/0244 148/24 |

\* cited by examiner

MULTILAYERED CERAMIC CAPACITOR WITH IMPROVED LEAD FRAME ATTACHMENT

CROSS-REFERENCE TO RELATED APPLICATIONS

The instant application is a divisional application of pending U.S. patent application Ser. No. 13/283,784 filed Oct. 28, 2011.

BACKGROUND

The present invention is related to an improved MLCC capacitor. More specifically, the present invention is related to an improved MLCC capacitor wherein the adhesion between the MLCC and lead frame is improved.

Multi-layered ceramic capacitors (MLCC's) are widely used throughout the electronics industry. In many applications the MLCC's have leads of opposing polarity for attachment of the capacitor to a circuit. At least one MLCC is between the leads. Often multiple MLCC's are between the leads such as in a stacked arrangement. A particular problem with leaded MLCC's is their susceptibility to cracking due to a mismatch in the Coefficient of Thermal Expansion (CTE) of various components. The thermal mismatch causes stresses when subjected to temperature cycling or thermal shock. Cracking due to thermal stress has been mitigated in the prior art by methods such as the use of lead frame materials with a CTE which is less than the CTE of the MLCC, as described in U.S. Pat. No. 6,081,416, or by adding a plated flexible conductive adhesive to the MLCC, as described in U.S. Pat. No. 6,388,864.

Regardless of the advances, the art is still lacking a suitable solution to mitigate thermal stress induced cracking. In particular, the cracking which occurs due to CTE mismatches in the plating layers, which allow solder adhesion to the lead frame, are now known to be a significant source of crack propagation.

SUMMARY OF THE INVENTION

It is an object of the invention to provide an improved capacitor, particularly, a capacitor with a decreased propensity for the crack propagation which occurs due to thermal cycling or thermal shock.

Another object of the invention is to eliminate spalling defects which are surface defects caused by a CTE mismatch between the nickel plating layers and the MLCC ceramic body that occur during reflow attachment of the MLCC to the lead frame.

A particular advantage is provided by eliminating the plating layers of the MLCC. Additional advantages are realized by application of a thin second coating of solderable silver over a flexible silver conductive adhesive to enhance soldering without plating. The flexible termination provides an extra level of protection against thermal shock cracking in addition to the protection provided by the lead frame such as by elevating the chip from the board. An additional benefit of eliminating the plating layers is the elimination of the spalling defect.

These and other advantages, as will be realized, are provided in an improved capacitor. The capacitor comprises parallel conductive internal electrodes of alternating polarity with a dielectric between the conductive internal electrodes. A first copper undercoat is in electrical contact with the conductive internal electrodes of a first polarity and a second copper undercoat is in electrical contact with conductive internal electrodes of a second polarity. A first lead is in electrical contact with the first copper undercoat with a first solder between the first lead and the first copper undercoat. A second lead is in electrical contact with the second copper undercoat with a second solder between the second lead and the second copper undercoat.

Yet another embodiment is provided in an improved capacitor. The capacitor has parallel conductive internal electrodes of alternating polarity with a dielectric between the conductive internal electrodes wherein the conductive internal electrodes comprise a precious metal. A first silver undercoat is in electrical contact with conductive internal electrodes of a first polarity and a second silver undercoat in electrical contact with conductive internal electrodes of a second polarity. A first solderable silver layer is in contact with the first silver undercoat and a second solderable silver layer is in contact with the second silver undercoat layers. A first lead is in electrical contact with the first silver undercoat with the first solderable silver layer between the first lead and the first silver undercoat and a second lead is in electrical contact with the second silver undercoat with the second solderable silver layer between the second lead and the second silver undercoat.

Yet another embodiment is provided in a method for forming a capacitor. The method includes the steps of:
providing a monolith comprising parallel conductive internal electrodes of alternating polarity with a dielectric between the conductive internal electrodes;
applying a first copper undercoat in direct electrical contact with the conductive internal electrodes having a first polarity;
applying a second copper undercoat in direct electrical contact with the conductive internal electrodes having a second polarity;
soldering a first lead frame in electrical contact with the first copper undercoat; and soldering a second lead frame in electrical contact with the second copper undercoat.

Yet another embodiment is provided in a method for forming a capacitor. The method includes the steps of:
providing a monolith comprising parallel conductive internal electrodes of alternating polarity with a dielectric between the conductive internal electrodes wherein the conductive internal electrodes comprise a precious metal;
applying a first silver undercoat in direct electrical contact with the conductive internal electrodes having a first polarity;
applying a second silver undercoat in direct electrical contact with the conductive internal electrodes having a second polarity;
applying a first flexible layer on the first silver undercoat;
applying a first solderable silver layer on the first flexible layer;
applying a second flexible layer on the second silver undercoat;
applying a second solderable silver layer on the second flexible layer;
soldering a first lead frame in electrical contact with the first silver solderable silver layer; and
soldering a second lead frame in electrical contact with the second silver solderable layer.

DESCRIPTION OF EMBODIMENTS

The present invention is related to an improvement in the attachment of a lead frame to an MLCC. More particularly, the present invention is related to an end metallization for an MLCC which allows for attachment to a lead frame with minimal crack propagation when the finished capacitor is subjected to thermal cycles or thermal shock. The improved metallization eliminates the need for plating of the MLCC's before soldering to a lead. The improved metallization utilizes the application of a low viscosity conductive-adhesive with solderable surface characteristics. This layer can then be soldered directly to the lead frame thus eliminating the plating step.

The invention will be described with reference to the various figures which are an integral, non-limiting, component of the disclosure. Throughout the various figures similar elements will be numbered accordingly.

Figure 1:
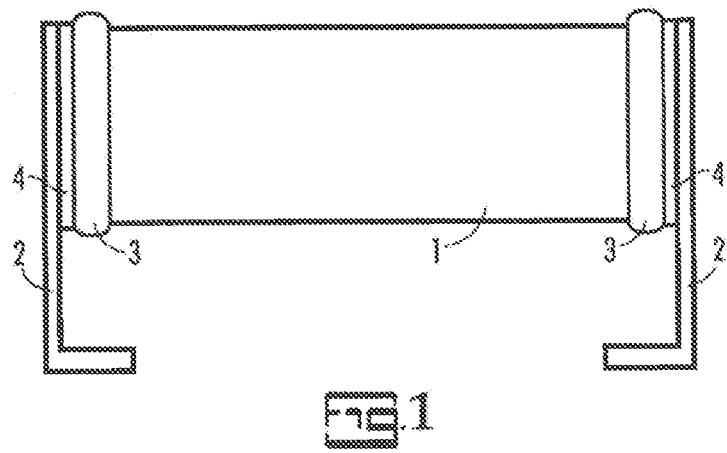
FIG. 1 is a side schematic view of an MLCC attached to lead frames.
Figure 2:
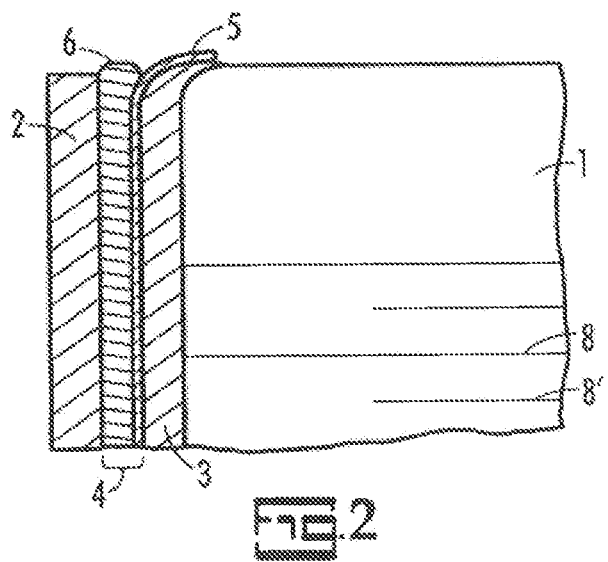
FIG. 2 is a cross-sectional partial side schematic view of an MLCC attached to lead frames.
Figure 3:
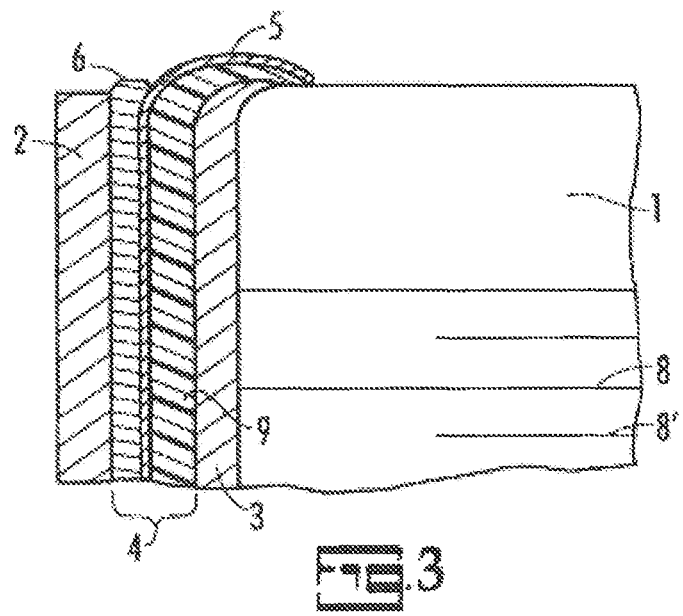
FIG. 3 is a cross-sectional partial side schematic view of an MLCC attached to lead frames.
Figure 4:
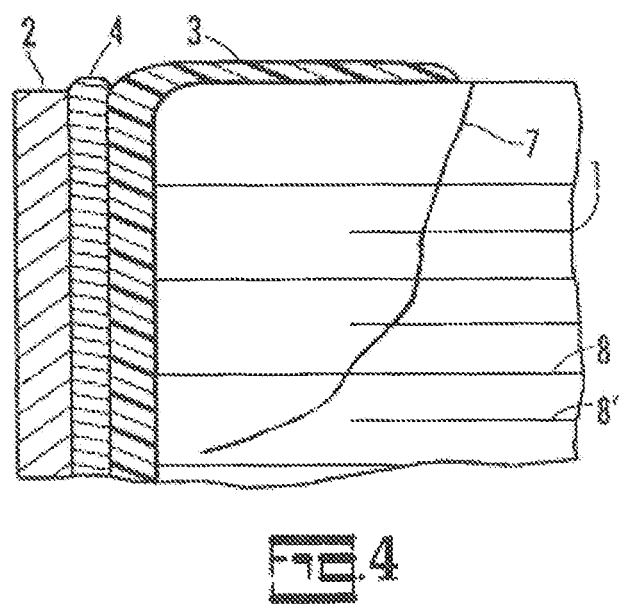
FIG. 4 is a cross-sectional partial side schematic view of an MLCC illustrating a crack.

In FIG. 1, an example of a lead frame 2, soldered to an MLCC, 1, is shown as typically done to improve temperature cycling resistance, flex robustness, or to reduce microphonics. A single MLCC chip, 1, or a plurality of chips can be attached to lead frames, 2, in vertical or horizontal orientations by attachment layers, 4, between the metallization, 3, and lead frame, 2. FIG. 2 illustrates a partial cross-sectional view of the attachment. The attachment layers, 4, comprise a plating barrier layer, 5, which is attached directly to the lead frame, 2, by solder, 6. FIG. 3 illustrates the additional use of a conductive adhesive, 9, between the plating layer, 5 and metallization, 3. FIG. 4 shows a crack, 7, which may form under the metallization, 3. Thermal stresses occur under thermal shock or temperature cycling due to the CTE mismatch of the MLCC and the lead frame. The crack may result in a failure if it propagates into the active area and disrupts electrical continuity of the internal electrodes, 8 and 8', of the MLCC.

Figure 5:
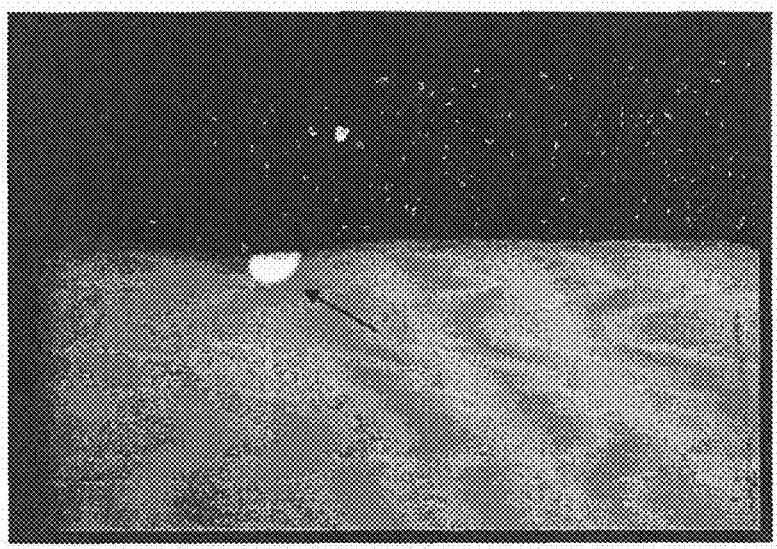
FIG. 5 is a cross-sectional view of a spalling defect on the surface of an MLCC near the end metallization.

In FIG. 5, a surface defect called spalling is shown. Spalling is a particular problem that can occur during lead attach processing when the MLCC surface temperature exceeds a certain temperature, approximately 320° C., which results in surface cracking due to a mismatch in the CTE between the nickel plating layer and the MLCC.

Figure 6:
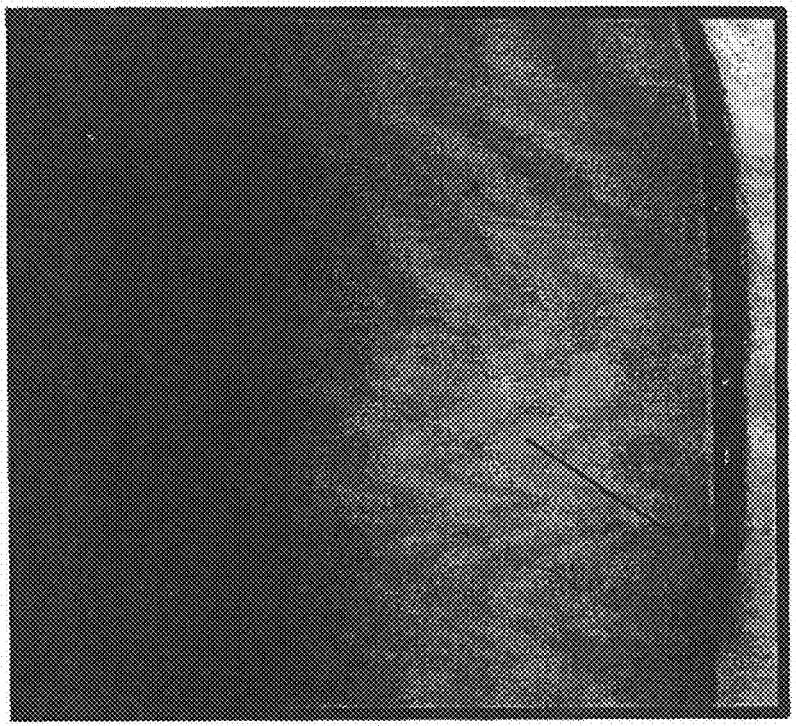
FIG. 6 is a cross-sectional view of a spalling defect showing a crack under the end metallization formed by the spalling damage.

FIG. 6 shows a cross-sectional view of the spalling defect. Typically, this defect does not extend into the active area of the capacitor. However, because the spalling defect is typically located at the interface of the nickel plating layer and the MLCC surface, a crack under the end metallization can occur as shown in FIG. 6. This crack at the end metallization interface can reduce hermeticity of the MLCC and increase the risk of humidity failures.

Figure 7:
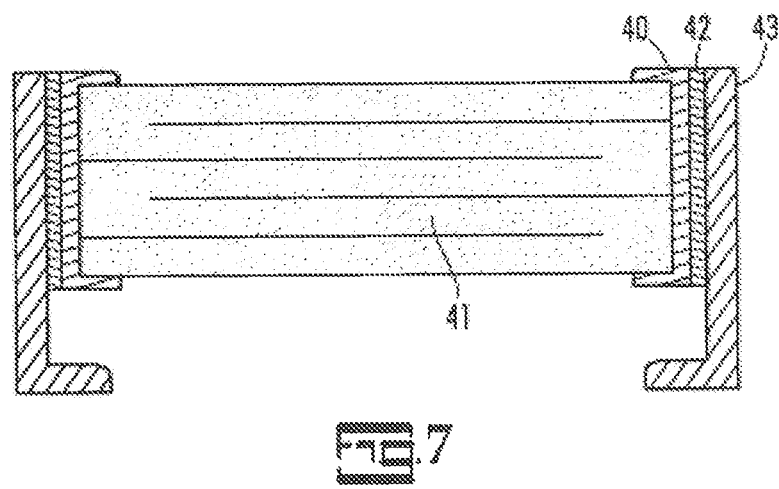
FIG. 7 is a schematic cross-sectional view showing PME MLCC's terminated with solderable silver end metallization attached to lead frames via a solder attachment method.

FIG. 7 shows a PME capacitor, 41, which is terminated with a solderable silver end metallization, 40. This un-plated MLCC is soldered, 42, directly to the lead frame, 43 without plating layers.

Figure 8:
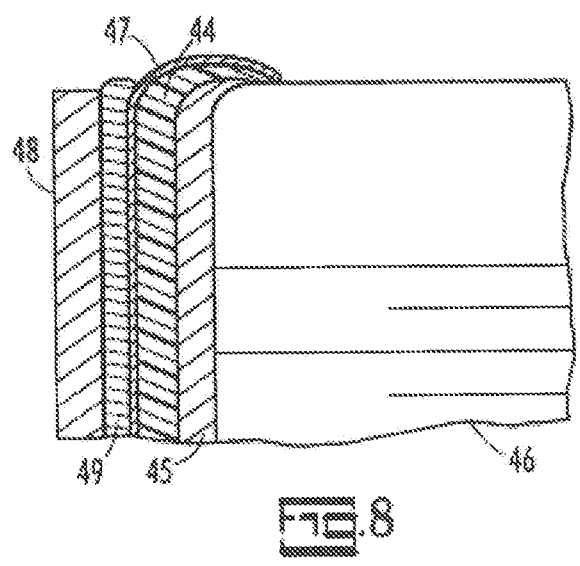
FIG. 8 is a schematic cross-sectional view showing fired copper terminated BME MLCC's or fired silver terminated PME MLCC's coated with a cured silver-filled epoxy flexible termination layer wherein the flexible termination layer is plated with typically nickel and tin or tin-lead.

FIG. 8 shows a flexible termination layer. 44, made of silver-filled conductive adhesive is cured on top of a fired copper-terminated, 45, BME MLCC or a fired silver-terminated PME MLCC, 46. The flexible termination layer is plated with typically nickel and tin or tin-lead, 47. The plated MLCC are connected to a lead frame, 48 by solder, 49, attachment method.

Figure 9:
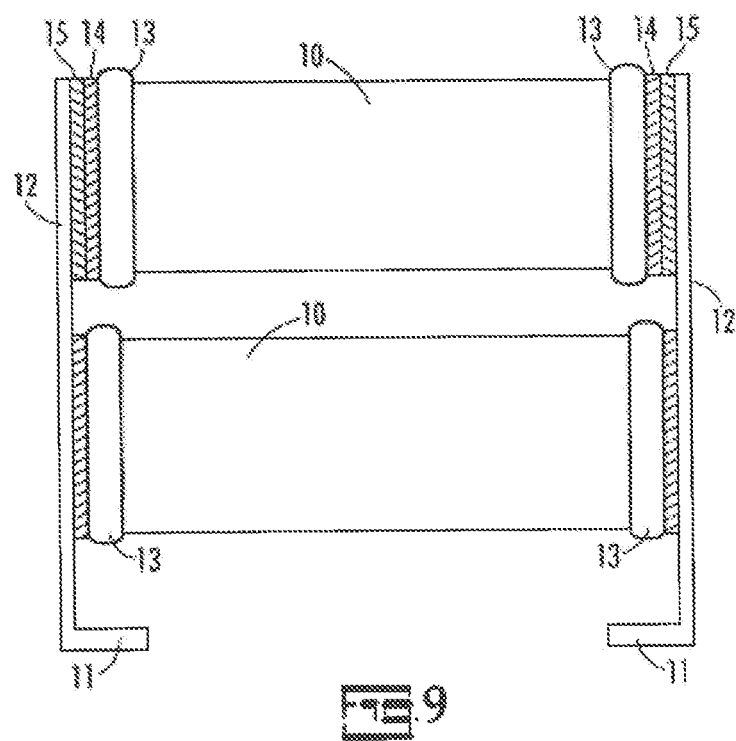
FIG. 9 is a side schematic view of MLCC's attached to lead frames.

An embodiment of the invention is illustrated in schematic side view in FIG. 9. In FIG. 9 a stack of BME MLCC's, 10, is illustrated. For the purposes of illustration only two MLCC's are illustrated for convenience to achieve twice the capacitance of a single MLCC. The number of MLCC's between electrodes is not particularly limited herein. The lowest MLCC is illustrated above the feet, 11, of the leads, 12, to isolate the MLCC from the mounting substrate. The solderable fired copper metallization, 13, is attached to the lead frames by a cured solderable silver epoxy, 14, which is attached to the lead frame by solder, 15.

Figure 10:
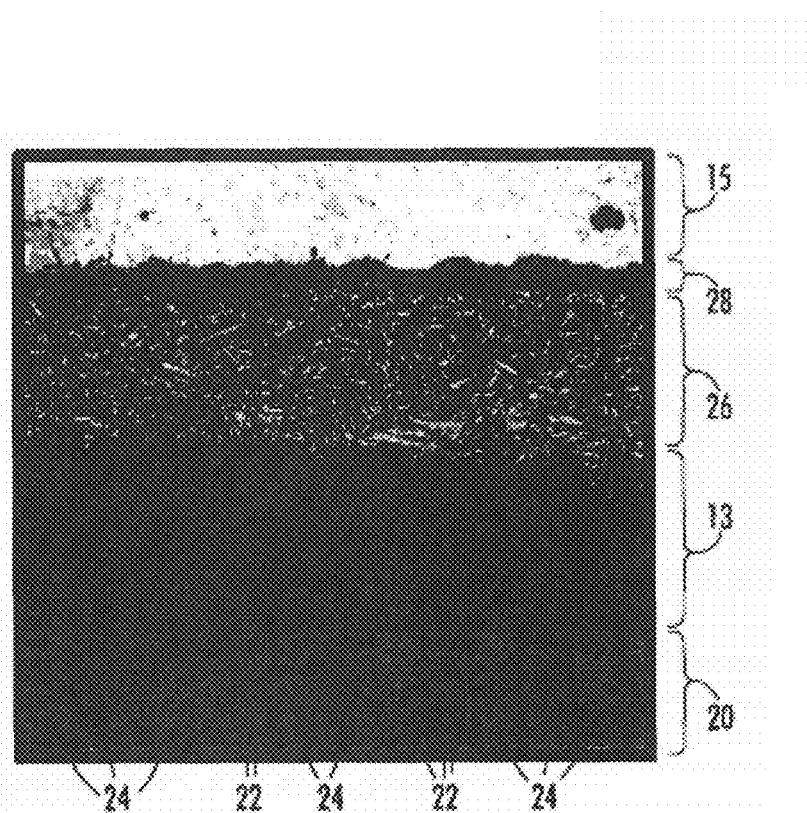
FIG. 10 is a side cross-sectional partial view of an MLCC attached to lead frames.
Figure 11:
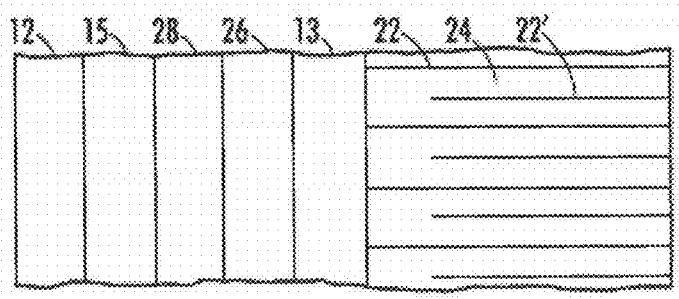
FIG. 11 is a side cross-sectional partial schematic view of an MLCC attached to lead frames.

Another embodiment of the invention is illustrated in cross-sectional side view in FIG. 10 and schematically in FIG. 11. In FIGS. 10 and 11, the MLCC, 20, comprises conductive internal electrodes, 22, with a common polarity separated by dielectric, 24. Internal electrodes of opposite polarity are not visible in FIG. 10. A sintered copper or silver undercoat, 13, is in direct electrical contact with the internal electrodes, 22, having a common polarity thereby forming a termination of the internal electrodes. The conductive internal electrodes can be a base metal electrode (BME) or a precious metal electrode (PME) with the proviso that when the sintered undercoat is silver the internal electrode is a PME. A flexible layer, 26, on the sintered copper or silver undercoat provides electrical conductivity to a solderable silver layer, 28, which is attached to a lead frame by solder, 15. The flexible layer absorbs stress from thermal or mechanical board flexure and allows compliance when the different components of the leaded device are under movement so as to protect the brittle MLCC from cracking. The sintered copper or silver undercoat, particularly in combination with the flexible layer, reduces exposure of MLCC to aggressive plating solutions that could compromise dielectric robustness. The lead frame is not visible in FIG. 10. The material layers are shown in FIG. 11 and described below:

A termination paste for preparing the sintered copper undercoat preferably comprises about (a) 75% to 90% by weight of solids in the paste being finely divided copper particles, (b) 5 to 20% by weight of solids the paste being cadmium-free and bismuth-free glass frit and more preferably the glass frit represents about 5-8% by weight of the solids (c) a volatile and decomposable organic liquid vehicle suspending the solids. The paste viscosity is suitable for applying by dipping with a typical viscosity is 20-50 Pa-s at 25° C. The paste is dried at around 140° C. for 10 minutes and sintered for 7 to 15 minutes between 800°-900° C. to achieve proper curing for copper. The cured film thickness is preferably between 1 and 100 microns and more preferably 10 and 100 microns. A particularly preferred copper undercoat has a surface oxide content of less than 1 percent and a surface glass content of less than 8 percent and a total copper film thickness greater than 1 micron.

A termination paste for preparing the sintered silver undercoat comprises about (a) 75% to 90% by weight of solids in the paste being finely divided silver particles, (b) 5 to 20% by weight of solids the paste being cadmium-free and lead-free glass frit and more preferably the glass frit represents about 5-8% by weight of the solids (c) a volatile and decomposable organic liquid vehicle suspending the solids. The paste viscosity is suitable for applying by dipping with a typical viscosity is 20-50 Pa-s at 25° C. The paste is dried around 140° C. for 10 minutes and sintered for 7 to 15 minutes between 650°-750° C. to achieve proper curing. The cured film thickness is preferably between 1 and 100 microns and more preferably 10 and 100 microns. A particularly preferred silver undercoat has a surface oxide content of less than 1 percent and a surface glass content of less than 8 percent and a total silver film thickness greater than 1 micron.

A flexible layer is preferably formed by applying a paste which preferably comprises about (a) 77-79 wt % solids in the paste being finely divided silver particles, (b) 10-15 wt % organic resins such as epoxy and (c) an organic solvent such as but not limited to butyl carbitol to adjust viscosity. The paste is dried at around 140° C. for 5-30 minutes and cured at 150-200° C. for 10-90 minutes. The electrical conductivity should be no more than 0.3 mohms-cm. The flexible layer is preferably a silver-filled conductive adhesive layer. The silver-filled conductive adhesive may be used as a paint with a low viscosity with a viscosity of at least about 5 Pa-S to no more than about 50 Pa-S at 25° C. suitable for demonstration of the teachings herein. More particularly, the viscosity of the silver-filled conductive adhesive paint is in the range of 7-15 Pa-s at 25° C. as measured with a Brookfield Viscometer Model RV type viscometer with a Spindle 14 and small volume adapter.

The solderable silver layer is preferably a silver-filled conductive adhesive layer. The silver-filled conductive adhesive may be used as a paint with a low viscosity of at least 1000 to no more 10,000 cps (1-10 Pa-S) as measured with a Brookfield RVT, Spindle #3, 20 RPM, @25° C. suitable for demonstration of the teachings herein. The solids content is between 30-60% and solvents such EB acetate and PM acetate are used to adjust viscosity. The resistivity of the dried film is <0.3 mohms-cm.

When a flexible layer is used an additional thin conductive adhesive layer, 28, is preferably applied on top of the flexible layer. The conductive adhesive layer has a solderable cured surface unlike the flexible termination conductive adhesive layer. The benefit of the conductive adhesive layer is that it can be dipped and cured onto the part thus eliminating the nickel and tin plating layers as commonly employed in the art and attached by a solder layer to a plated lead frame. By not having the nickel and tin plated layers, stress from the CTE mis-match between the nickel underplate layer and the sintered copper end metallization is eliminated thus significantly mitigating the initiation of surface cracks in the ceramic, often referred to as "spalling", which often occur upon lead attachment due to the heat fluctuations from the soldering operation.

Figure 12:
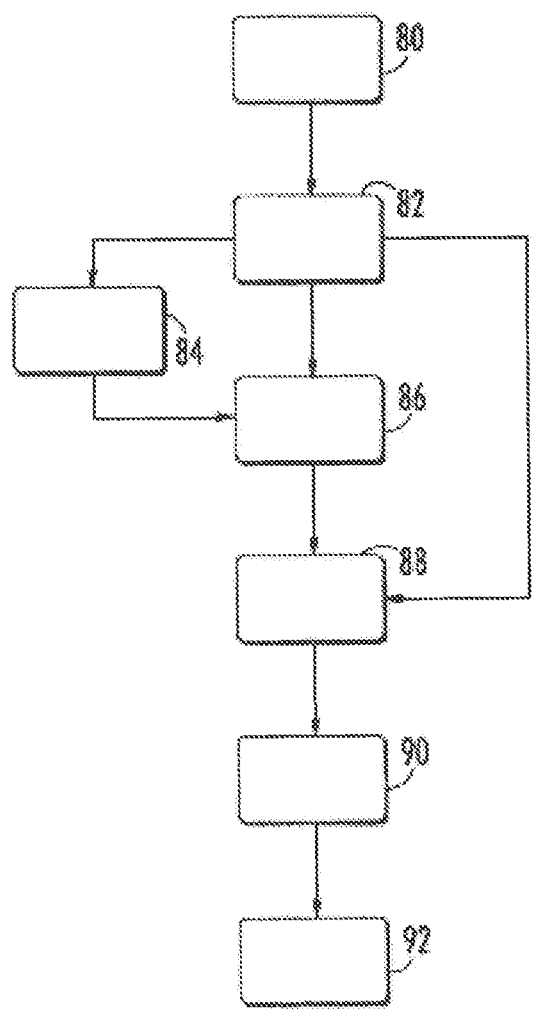
FIG. 12 is a flow chart representation of a method of forming a capacitor.

An embodiment of the invention will be described with reference to FIG. 12 wherein the process for forming the capacitor is illustrated in the form of a flow chart. An MLCC is prepared at 80. The method of forming the MLCC is not particularly limited herein and any method employed in the art is suitable for demonstration of the teachings herein. The MLCC has conductive internal electrodes of alternating polarity terminating at different locations with a dielectric between the conductive internal electrodes.

A copper or silver undercoat is applied to the MLCC at 82 to form external terminations with at least one external terminal of each polarity. In a preferred embodiment the external terminations are on opposing sides of the MLCC yet other embodiments are suitable for demonstration of the invention such as a plurality of external terminations on a single face with each external termination being in electrical contact with internal conductive electrodes of only one polarity. The copper or silver undercoat is preferably applied as a paste and cured, or fired, prior to the application of subsequent coatings.

In one embodiment the copper or silver undercoat can be treated to improve adhesion of subsequent layers. Acid plasma cleaning is a particularly preferred method for treating copper and silver undercoat layers.

In one embodiment a flexible layer is applied at 84. The flexible layer is preferably applied by coating a silver-filled conductive adhesive, which is a silver filled polymeric matrix, onto the copper or silver undercoat followed by drying and curing. The silver-filled conductive adhesive layer is preferably applied by dipping or spraying onto the surface at the appropriate location. Dipping is preferred due to the manufacturing simplicity offered thereby.

A solderable silver layer is applied to either the flexible layer or directly to the copper or silver undercoat at 86. The solderable silver layer is preferably applied as paste which is subsequently cured. A particular advantage of the copper or silver undercoat layer and solderable silver layer is the ability to form a conductive robust bond while excluding nickel and tin plating layers. The substitution of nickel and tin layers with a solderable silver layer mitigates the stresses caused by CTE mismatch between the MLCC and the plating layers thus mitigating the propensity for spalling to occur.

The solder is preferably lead-free and preferably comprises 5-30 wt % antimony.

The MLCC with a copper undercoat as the external termination is placed within a lead frame at 88 and secured to the lead frame by soldering at 90. In this embodiment, the lead frame is soldered directly to the copper undercoat.

The lead frame preferably comprises, but is not limited to, materials selected from phosphor bronze alloy 510, nickel iron alloy 42 or copper iron alloy 194 and has a thickness of 76-500 microns.

The capacitor is finished at 92. Finishing can include encasing in a non-conducting resin, testing and packing.

The MLCC is soldered to a plated lead frame. The solder could comprise lead or, more preferably, could be lead-free. To improve adhesion, a silver-containing solder is preferred when silver containing layers are used to reduce leaching of the Ag in the end metallization during soldering. To achieve a Pb-free robust solder joint, an epoxy-containing flux may be used in the solder formulation thereby providing additional mechanical strength at higher temperatures thus preventing secondary reflow.

The dielectric is not particularly limited herein. The conductive plates are separated by a dielectric as well known in the art and exemplified in U.S. Pat. Nos. 7,211,740; 7,172,985; 7,164,573; 7,054,137; 7,068,490 and 6,906,907 each of which is incorporated herein by reference. Conductive plates separated by dielectric forms a capacitor as known in the art. While not limited thereto, a dielectric layer with a thickness of about 0.2 µm up to about 50 µm is suitable for demonstration of the teachings herein. The number of dielectric layers stacked is generally from 2 to about 500 without limit thereto.

The conductive material which forms the internal electrodes is not critical, although a base metal electrode (BME) is preferably used due to cost considerations particularly when the dielectric material of the dielectric layers has anti-reducing properties. Typical base metals are nickel, copper, titanium, tungsten, molybdenum, alloys or cermets of base metals or base metal alloys with nickel being preferred. Preferred nickel alloys are alloys of nickel with at least one member selected from Cu, Si, Ba, Ti, Mn, Cr, Co, and Al, with such nickel alloys containing at least 95 wt % of nickel being more preferred. Precious metal electrodes (PME) can be used with the proviso that a sintered silver undercoat is used. Preferred precious metals include silver, palladium, gold, platinum and alloys thereof such as silver-palladium and silver-palladium-platinum. The thickness of the internal electrodes is not particularly limited although about 0.2 m to about 5 m is suitable for demonstration of the teachings herein.

The multilayer ceramic chip capacitor of the present invention generally is fabricated by forming a green chip by conventional printing and sheeting methods using pastes, firing the chip, and printing or transferring external electrodes thereto followed by baking.

Paste for forming the dielectric layers can be obtained by mixing a raw dielectric material with an organic or aqueous vehicle. The raw dielectric material may be a mixture of oxides and composite oxides as previously mentioned. Also useful are various compounds which convert to such oxides and composite oxides upon firing. These include, for example; carbonates, oxalates, nitrates, hydroxides, and organometallic compounds. The dielectric material is obtained by selecting appropriate species from these oxides and compounds and mixing them. The proportion of such compounds in the raw dielectric material is determined such that after firing, the specific dielectric layer composition may be met. Raw dielectric material in a powder form having a mean particle size of about 0.1 to about 3 µm is suitable for demonstration of the teachings herein. Dielectrics are well known and not limited herein.

A green chip may be prepared from the dielectric layer-forming paste and the internal electrode layer-forming paste. In the case of deposition by printing methods, a green chip is prepared by alternately printing the pastes onto a substrate of polyethylene terephthalate (PET), for example, in laminar form, cutting the laminar stack to a predetermined shape and separating it from the substrate.

Also useful is a sheeting method wherein a green chip is prepared by forming green sheets from the dielectric layer-forming paste, printing the internal electrode layer-forming paste on the respective green sheets, and stacking the printed green sheets.

The binder is then removed from the green chip and fired. Binder removal may be carried out under conventional conditions where the internal electrode layers are formed of a base metal conductor such as nickel and nickel alloys.

The term "direct" with reference to electrical contact is taken to define an electrical connection between two layers with no layer there between. When two layers of different composition are combined a blended layer wherein one component diffuses into the other thereby forming an intermediate composition is considered a direct electrical connection.

Paste for forming internal electrode layers is obtained by mixing an electro-conductive material with an organic or aqueous vehicle. The conductive material used herein includes conductors such as conductive metals and alloys as mentioned above and various compounds which convert into such conductors upon firing, for example, oxides, organometallic compounds and resinates.

EXAMPLE 1

A BME MLCC with nickel internal electrodes was dipped in copper paste consisting of an acrylic resin dispersed in dihyro-terpeniol solvent. The solids content was about 77% by weight of finely divided copper and about 10 percent by weight of cadmium-free and bismuth-free glass frit. The viscosity of this paste was adjusted to about 13 Pa-s by further additions of dihyro-terpeniol. After dipping, the MLCC was dried at 140° C. for 20 minutes in air atmosphere and then cured, or fired, at 900° C. for 10 minutes in an inert atmosphere.

The BME MLCC with fired copper end metallization was soldered directly to a phosphor bronze lead frame that was plated with a nickel barrier plating layer and a tin overplate layer. 91.5 Sn 8.5 Sb lead free HMP solder was reflowed above 280° C. to attach the fired copper end met directly to the plated lead frame. The reflow was conducted within 24 hours of copper firing so as to minimize oxide layers from building up on the fired copper end metallization rendering it unsolderable.

EXAMPLE 2

A BME MLCC with nickel internal electrodes was dipped in copper paste consisting of an acrylic resin dispersed in dihyro-terpeniol solvent. The solids content was about 77% by weight of finely divided copper and about 10 percent by weight of cadmium-free and bismuth-free glass frit. The viscosity of this paste was adjusted to about 13 Pa-s by further additions of dihyro-terpeniol. After dipping, the MLCC was dried at 140° C. for 20 minutes in air atmosphere and then cured, or fired, at 900° C. for 10 minutes in an inert atmosphere.

The fired copper termination layer was then dipped in a conventional solderable silver consisting of a silver-bearing, thermoplastic paint. This layer of silver paint was dried at 30° C. for 45 minutes, pre-cured between 60-70° C. for 30 minutes and cured at 150° C. for 60 minutes.

The lead frame was attached to the cured silver with a 8.5% Sb 91.5% Sn solder alloy rosin mildly activated (RMA) flux system available from Henkel as 92ADA100AP85V using a resistance-heated hot bar contact reflow soldering method. The soldering temperature was >280° C. in the solder joint. The resulting product had adhesion peel strength greater than 0.60 kg and electrical properties such as control capacitance, dissipation factor and internal resistance similar to the MLCC.

EXAMPLE 3

A BME MLCC with nickel internal electrodes was dipped in copper paste consisting of an acrylic resin dispersed in dihyro-terpeniol solvent. The solids content was about 77% by weight of finely divided copper and about 10 percent by weight of cadmium-free and bismuth-free glass frit. The viscosity of this paste was adjusted to about 13 Pa-s by further additions of dihydro-terpeniol. After dipping, the MLCC was dried at 140° C. for 20 minutes in air atmosphere and then cured (fired) at 900° C. for 10 minutes in an inert atmosphere.

A flexible layer paste was applied to the copper undercoat using a dipping process. The flexible layer paste consisted about of 78% by weight of solids in the paste being finely divided silver particles and about 12% by weight of epoxy organic resin and the remainder being a an organic solvent, butyl carbitol. Further additions of butyl carbitol were used to adjust viscosity of the final paste to about 15 Pa-s. Following dipping, the flexible paste was dried at 140° C. for 20 minutes and cured at 180° C. for 60 minutes. The electrical conductivity was <0.3 mohms-cm.

The flexible termination layer was then dipped in a conventional solderable silver consisting of a silver-bearing, thermoplastic paint. This layer of silver paint was dried at 30° C. for 45 minutes, pre-cured between 60-70° C. for 30 minutes and cured at 150° C. for 60 minutes.

The lead frame was attached to the cured silver with a 8.5% Sb 91.5% Sn solder alloy rosin mildly activated (RMA) flux system available from Henkel as 92ADA100AP85V using a resistance-heated hot bar contact reflow soldering method. The soldering temperature was >280° C. in the solder joint. The resulting product had adhesion peel strength greater than 0.60 Kg and electrical properties such as control capacitance, dissipation factor and, internal resistance similar to the MLCC.

The addition of the flexible layer between the copper or silver undercoat and the solderable silver paint mitigates thermal or mechanical cracking by changing the failure mode when thermal or mechanical stresses are applied so as to result in a tear in the cured epoxy flexible termination layer rather than a crack in the MLCC. This provides a preferred failure mode which prevents the MLCC from shorting out under thermal or mechanical stress.

The invention has been described with reference to the preferred embodiments without limit thereto. One of skill in the art will realize additional embodiments and improvements which are not specifically stated but which are within the metes and bounds of the invention as more specifically set forth in the claims appended hereto.

The invention claimed is:

1. A method for forming a capacitor comprising the steps of:
    providing a monolith comprising parallel conductive internal electrodes of alternating polarity with a dielectric between said conductive internal electrodes;
    applying a first copper undercoat in direct electrical contact with said conductive internal electrodes having a first polarity;
    applying a second copper undercoat in direct electrical contact with said conductive internal electrodes having a second polarity wherein said first copper undercoat or said second copper undercoat has a total copper film thickness of at least 1 microns to no more than 100 microns;
    forming a flexible termination wherein said forming of said flexible termination comprises forming a solderable silver layer wherein said solderable silver layer comprises conductive adhesive;
    soldering a first lead frame to said solderable silver layer in electrical contact with said first copper undercoat; and
    soldering a second lead frame in electrical contact with said second copper undercoat; and
    wherein said forming said solderable silver layer comprises applying a solution with a solids content of 30-60 wt %.

2. The method of forming a capacitor of claim 1 wherein said flexible termination comprises silver particles in a polymeric matrix.

3. The method for forming a capacitor of claim 1 wherein said forming of said solderable silver layer comprises applying said solution with a viscosity of 1-10 Pa-S at 25° C.

4. The method for forming a capacitor of claim 1 wherein said first copper undercoat or said second copper undercoat has an surface oxide content of less than 1 percent.

5. The method for forming a capacitor of claim 1 wherein said first copper undercoat or said second copper undercoat has a surface glass content of about 5 to about 20 wt. percent.

6. The method for forming a capacitor of claim 5 wherein said first copper undercoat or said second copper undercoat has a surface glass content of about 5 to about 8 wt. percent.

7. The method for forming a capacitor of claim 1 wherein said first copper undercoat or said second copper undercoat has a total copper film thickness of at least 10 microns to no more than 100 microns.

8. The method for forming a capacitor of claim 1 further comprising surface treating of said copper.

9. The method for forming a capacitor of claim 8 further wherein said surface treating is acid cleaning or plasma cleaning.

10. The method for forming a capacitor of claim 1 wherein said applying a first copper undercoat comprises applying a solution with a viscosity of 20-50 Pa-S at 25° C.

11. The method for forming a capacitor of claim 1 wherein said applying a first copper undercoat comprises applying a paste comprising about 75-90 wt % copper and about 5-20 wt % glass frit.

12. The method for forming a capacitor of claim 11 wherein said applying a first copper undercoat comprises applying a paste comprises about 5-8 wt % glass frit.

13. The method for forming a capacitor of claim 11 wherein said glass frit is cadmium and bismuth free.

14. The method for forming a capacitor of claim 1 wherein said internal electrodes comprise a base metal.

15. The method for forming a capacitor of claim 14 wherein said base metal is selected from nickel, copper, titanium, tungsten and molybdenum.

16. The method for forming a capacitor of claim 15 wherein said internal electrodes comprise an alloy of nickel.

17. The method of forming a capacitor of claim 16 wherein said alloy comprises at least one material selected from the group consisting of Cu, Si, Ba, Ti, Mn, Cr, Co, and Al.

18. The method of forming a capacitor of claim 17 wherein said alloy comprises at least 95 wt % nickel.

19. The method of forming a capacitor of claim 1 wherein said lead frame comprises a material selected from phosphor bronze alloy 510, nickel iron alloy 42, and copper iron alloy 194.

20. The method of forming a capacitor of claim 1 wherein said lead frame has a thickness of 76-500 microns.

21. The method of forming a capacitor of claim 1 wherein said soldering a first lead frame comprises soldering with a material which is lead free.

22. The method of forming a capacitor of claim 21 wherein said solder comprises 5-30 wt % antimony.

23. A method for forming a capacitor comprising the steps of:
    providing a monolith comprising parallel conductive internal electrodes of alternating polarity with a dielectric between said conductive internal electrodes wherein said conductive internal electrodes comprise a precious metal;

applying a first silver undercoat in direct electrical contact with said conductive internal electrodes having a first polarity;

applying a second silver undercoat in direct electrical contact with said conductive internal electrodes having a second polarity;

applying a first flexible layer on said first silver undercoat;

applying a first solderable silver layer on said first flexible layer wherein said first solderable silver layer comprises conductive adhesive;

applying a second flexible layer on said second silver undercoat;

applying a second solderable silver layer on said second flexible layer wherein said second solderable silver layer comprises conductive adhesive;

soldering a first lead frame in electrical contact with said first silver solderable silver layer;

soldering a second lead frame in electrical contact with said second silver solderable layer;

further comprising forming said solderable silver layer after said forming said flexible layer and prior to said soldering a first lead frame; and wherein said forming a solderable silver layer comprises applying a solution with a solids content of 30-60 wt %.

24. The method of forming a capacitor of claim 23 wherein said first flexible layer comprises silver particles in a polymeric matrix.

25. The method of forming a capacitor of claim 23 wherein said first flexible layer is formed by applying a paste and drying said paste.

26. The method of forming a capacitor of claim 25 wherein said paste comprises 77-79 wt % silver particles and 10-15 wt % organic resin in an organic solvent.

27. The method of forming a capacitor of claim 25 wherein said paste has a viscosity of at least 5 Pa-S to no more than about 50 Pa-S at 25° C.

28. The method of forming a capacitor of claim 27 wherein said paste has a viscosity of at least 7 Pa-S to no more than about 15 Pa-S at 25° C.

29. The method for forming a capacitor of claim 23 wherein said forming a solderable silver layer comprises applying said solution with a viscosity of 1-10 Pa-S at 25° C.

30. The method for forming a capacitor of claim 23 wherein said first silver undercoat or said second silver undercoat has a total silver film thickness of at least 1 micron to no more than 100 microns.

31. The method for forming a capacitor of claim 30 wherein said first silver undercoat or said second silver undercoat has a total silver film thickness of at least 10 micron to no more than 100 microns.

32. The method for forming a capacitor of claim 23 wherein said applying said first silver undercoat comprises applying a paste and drying said paste.

33. The method for forming a capacitor of claim 23 wherein conductive internal electrodes comprises a material selected from silver, palladium, gold, platinum and alloys thereof.

34. The method for forming a capacitor of claim 33 wherein said conductive internal electrodes comprise silver-palladium or silver-palladium-platinum.

35. The method of forming a capacitor of claim 23 wherein said lead frame comprises a material selected from phosphor bronze alloy 510, nickel iron alloy 42, and copper iron alloy 194.

36. The method of forming a capacitor of claim 23 wherein said lead frame has a thickness of 76-500 microns.

37. The method of forming a capacitor of claim 23 wherein said soldering a first lead frame comprises soldering with a material which is lead free.

38. The method of forming a capacitor of claim 23 wherein said solder comprises 5-30 wt % antimony.

39. A method for forming a capacitor comprising the steps of:

providing a monolith comprising parallel conductive internal electrodes of alternating polarity with a dielectric between said conductive internal electrodes wherein said conductive internal electrodes comprise a precious metal;

applying a first silver undercoat in direct electrical contact with said conductive internal electrodes having a first polarity;

applying a second silver undercoat in direct electrical contact with said conductive internal electrodes having a second polarity;

applying a first flexible layer on said first silver undercoat;

applying a first solderable silver layer on said first flexible layer wherein said first solderable silver layer comprises conductive adhesive;

applying a second flexible layer on said second silver undercoat;

applying a second solderable silver layer on said second flexible layer wherein said second solderable silver layer comprises conductive adhesive;

soldering a first lead frame in electrical contact with said first silver solderable silver layer; and soldering a second lead frame in electrical contact with said second silver solderable layer;

wherein said applying said first silver undercoat comprises applying a paste and drying said paste wherein said paste comprises at least about 75 wt % to no more than about 90 wt % silver and at least about 5 wt % to no more than about 20 wt % glass frit.

40. The method for forming a capacitor of claim 39 wherein said paste comprises about 5-8 wt % glass frit.

41. The method for forming a capacitor of claim 39 wherein said glass frit is cadmium and bismuth free.

* * * * *